United States Patent [19]

Hunt

[11] Patent Number: 4,534,169
[45] Date of Patent: Aug. 13, 1985

[54] POWER TRANSMISSION SYSTEM

[75] Inventor: Michael S. Hunt, Edenvale, South Africa

[73] Assignee: South African Inventions Development Corp., Transvaal, South Africa

[21] Appl. No.: 385,190

[22] Filed: Jun. 4, 1982

[30] Foreign Application Priority Data

Jun. 11, 1981 [ZA] South Africa ........................ 81/3941
Apr. 1, 1982 [ZA] South Africa ........................ 82/2259

[51] Int. Cl.³ .......................... B60K 9/00; F01B 21/00
[52] U.S. Cl. ........................................ 60/414; 60/718; 180/65.2; 180/165
[58] Field of Search ............... 180/165, 65.2; 310/115, 310/92, 98; 60/718, 414

[56] References Cited

U.S. PATENT DOCUMENTS

| 467,048 | 1/1892 | Palmer | 310/115 |
|---|---|---|---|
| 2,763,164 | 9/1956 | Neklutin | 74/687 |
| 3,367,440 | 2/1968 | Becker | 180/65.2 |
| 3,427,899 | 2/1969 | Gunderson et al. | 74/687 |
| 3,497,026 | 2/1970 | Calvert | 180/65 |
| 3,614,494 | 10/1971 | Borchers et al. | 310/126 |
| 3,748,924 | 7/1973 | Cross et al. | 74/687 |
| 3,851,544 | 12/1974 | Herman | 74/677 |
| 3,892,283 | 7/1975 | Johnson | 180/66 R |
| 3,903,696 | 9/1975 | Carman | 60/414 |
| 3,923,115 | 12/1975 | Helling | 180/65 A |
| 4,098,083 | 7/1978 | Carman | 60/414 |
| 4,098,144 | 7/1978 | Besel et al. | 74/687 |
| 4,132,283 | 1/1979 | McCurry | 180/66 R |
| 4,227,587 | 10/1980 | Carman | 180/165 |
| 4,405,028 | 9/1983 | Price | 310/115 |

FOREIGN PATENT DOCUMENTS

| 232143 | 3/1964 | Austria | 310/115 |
|---|---|---|---|
| 307421 | 5/1917 | Fed. Rep. of Germany . | |
| 2551580 | 5/1977 | Fed. Rep. of Germany . | |
| 2422281 | 2/1979 | France . | |
| 1376772 | 12/1974 | United Kingdom . | |
| 1523342 | 8/1978 | United Kingdom . | |

OTHER PUBLICATIONS

M. S. Hunt, "Partial Hydrostatic Transmissions and Regeneration Using a Hydraulic Accumulator", dated Apr. 1979.
M. S. Hunt, National Mechanical Engineering Research Institute (NMERI), Internal Report No. ME1617/2, ME1617/3 dated Jul. 1979, ME1617/4 dated Aug. 1979, ME1650/2 dated Apr. 1980.

Primary Examiner—Irwin C. Cohen
Attorney, Agent, or Firm—Ladas & Parry

[57] ABSTRACT

A power transmission system is provided, suitable e.g. for driving an electrical vehicle from a power supply such as on an electrochemical battery. The system provides an electric motor having two relatively rotatable motor portions. Each motor portion is relatively rotatable to an anchorage or mounting for the motor, coaxially with the axis of rotation between the motor portions. One motor portion is provided with the power output for the system and the other motor portion is drivingly connected to a hydrostatic machine capable of acting as a pump or motor which is in liquid flow communication with a hydrostatic accumulator and liquid source.

10 Claims, 9 Drawing Figures

POWER TRANSMISSION SYSTEM

This invention relates to a power transmission system. In particular it relates to a power transmission system suitable for battery-driven electric vehicles.

According to the invention, a power transmission system comprises an electric motor for connection to an electric power supply, the motor comprising two relatively rotatable motor portions, each of which is rotatable relative to an anchorage or mounting for the motor, co-axially with the axis of rotation between the two motor portions, one of the motor portions being provided with a power output for the system, and the other being drivingly connected to a hydrostatic machine capable of acting as a pump or as a motor, and in liquid flow communication with a hydrostatic accumulator and a liquid source.

The system will, as described hereunder, be arranged to convert electric power from the power supply, which may be a battery, to rotary power at the power output, which may be in the form of a power output shaft, e.g. to drive a vehicle via its drive wheels.

The two relatively rotatable motor portions may be those conventionally regarded as the rotor portion and stator portion, wherein conveniently it may be the stator portion which is rotatably mounted on the anchorage or mounting. The stator portion may be provided with a slip ring arrangement for connection to the power supply. Instead, both the rotatable motor portions may be co-axially rotatable relative to a fixedly mounted motor portion which is not rotatable relative to the anchorage or mounting. In each case, however, the motor portions will be relatively rotatable to each other, and each will be relatively rotatable to the anchorage or mounting, about the same axis whereby the motor portions are rotatable relative to each other.

The hydrostatic accumulator may be a tank for containing a gas under pressure and liquid, the liquid source being a liquid reservoir arranged during operation of the system to supply liquid to the tank and receive liquid from the tank.

The two motor portions may be provided with a clutch whereby they are lockable relative to each other. The clutch may be arranged to lock the motor portions when there is no electric power supply to the electric motor, and to release them automatically when electric power is supplied to the motor.

The hydrostatic machine may be a fixed stroke hydrostatic machine operable between the accumulator and liquid source, the hydrostatic machine having a three-way valve whereby its connection to the liquid source and accumulator can be reversed, and whereby it can be short-circuited and isolated simultaneously from said accumulator and source. In other words, when the outlet of the machine leads to the accumulator, the inlet will lead to the reservoir or vice versa, or the outlet will lead to the inlet so that the machine is short-circuited so that it operates under no-load conditions. Instead, to reduce transmission shocks, the hydrostatic machine may be a variable stroke hydrostatic machine.

When the power transmission system is used to drive a battery-driven vehicle, it may be the rotor portion which has the power output, which may be a power output shaft directly or indirectly drivingly connected to the drive wheels of the vehicle, the stator portion being connected mechanically to the hydrostatic machine and electrically through slip rings to an electrochemical power storage battery on the vehicle. It should, however, be borne in mind that the rotor portion could instead be connected to the hydrostatic machine, with the stator portion being connected to the power output, and an electric motor of the type mentioned above having two motor portions co-axially rotatable relative to a fixedly mounted motor portion, is a mechanical equivalent, wherein the power supply can be to the fixedly mounted motor portion, and wherein the rotatable motor portions can be lockable by the clutch.

Instead, the system may include two fixed stroke hydrostatic machines connected in parallel between and in liquid flow communication with the accumulator and the liquid source, the one machine being drivingly connected to one motor portion, and the other machine being drivingly connected to the other motor portion, each machine having a three-way valve whereby its connections to the liquid source and the accumulator can be reversed, and whereby it can be short-circuited and isolated simultaneously from said accumulator and source. Once again, to reduce transmission shocks at start up, either or both the hydrostatic machines may instead be variable stroke hydrostatic machines. When there are two hydrostatic machines, the system may include two hydrostatic accumulators of different volumes, each being adapted to hold liquid and gas under pressure, and each being in liquid flow communication with the hydrostatic machines. Each hydrostatic accumulator may be provided with a shut-off valve for isolating it from the hydrostatic machines; and the power output may be from a shaft between one of the motor portions and the associated hydrostatic machine.

Alternatively, the system may include two variable stroke hydrostatic machines connected in parallel between and in liquid flow communication with the accumulator and liquid source, the one machine being drivingly connected to the one motor portion, and the other machine being drivingly connected to the other motor portion, a shut-off valve and a non-return valve being provided, in parallel, between the hydrostatic machines and the accumulator, the non-return valve permitting flow into the accumulator only. In this case, the power output may also be from a shaft between one of the motor portions and the associated hydrostatic machines The invention will now be described, by way of example, with reference to the accompanying diagrammatic drawings, in which.

Figure 1:
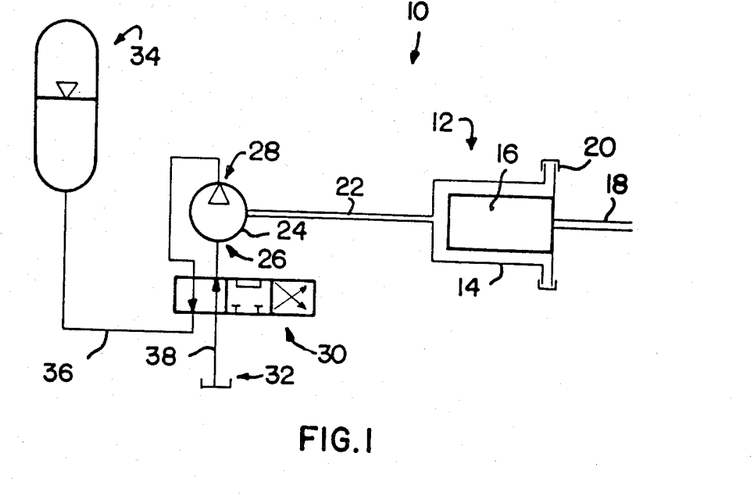
FIG. 1 shows a schematic diagram of a power transmission system in accordance with the invention.

With reference first to FIG. 1 of the drawings, reference numeral 10 generally designates a power transmission system in accordance with the invention. The power transmission system comprises an electric motor 12 having a stator portion 14 rotatably mounted on a mounting or anchorage (not shown) on a battery-driven wheeled vehicle (also not shown). The stator portion 14 is provided with a slip ring arrangement for feeding electric power thereto from a power supply in the form of an electrochemical battery. For ease of illustration, the slip ring arrangement and battery are omitted from FIG. 1.

The motor 12 has a rotor portion 16 rotatable relative to the stator portion, co-axial with the rotation of the stator portion 14 on its anchorage or mounting. The rotor portion 16 has a power output shaft 18 for connection to the vehicle wheels (not shown) and the stator portion 14 and rotor portion 16 are lockable together by means of a clutch 20 to prevent relative rotation therebetween.

The stator portion 14 is in turn provided with a shaft 22 rotatable about the axis of the motor 12, and drivingly connected to a fixed stroke hydrostatic machine 24 which is capable of acting as a pump or motor. The machine 24 has a liquid inlet at 26 and a liquid outlet at 28, the inlet 26 and the outlet 28 being in communication via a three-way valve 30 with a liquid reservoir 32 and a hydrostatic accumulator 34 in the form of a tank filled with gas under pressure. In FIG. 1, the outlet 28 is shown connected to the accumulator 34 by flow line 36 passing through valve 30, the inlet 26 in turn being shown connected to the reservoir 32 by a flow line 38 passing through the valve 30.

The valve 30 is capable of placing the outlet 28 in communication with either the reservoir 32 or the tank 34, and simultaneously placing the inlet 26 in communication respectively with either the tank 34 or the reservoir 32, to permit flow from the reservoir to the tank via the machine 24 or vice versa; and the valve 30 is also capable of short-circuiting the machine 24, so that the outlet 28 is placed directly in communication with the inlet 26.

Use of the power transmission system of FIG. 1, for driving a battery-driven vehicle, will now be described.

At initial start-up, usually after the vehicle has been stationary for some time and when the tank 34 is empty of liquid, the system is arranged to have the clutch 20 disengaged so that the rotor 16 can rotate freely relative to the stator 14, and the valve 30 is arranged in the short-circuit position so that rotation of the motor 12 causes the machine 24 to act as a pump, the outlet 28 feeding directly to the inlet 26.

When electric power from the battery is now supplied via the slip rings to the stator 14, the rotor 16 starts to rotate relative to the stator 14. The inertia of the vehicle keeps the shaft 18 and rotor 16 substantially stationary, so that the stator 14 rotates on its mounting. The electric connections to the motor 12 will have been arranged so that the direction of rotation of the stator 14 is such as to operate the machine 24 as a pump which receives liquid at inlet 26 and discharges it at outlet 28. As the machine 24 has been short-circuited with the outlet 28 leading directly to the inlet 26, little or no resisting torque is experienced from the machine 24, and the motor 12 can run freely with little or no output torque on the shaft 18.

The valve 30 is then operated to place it in the mode shown in FIG. 1, with the inlet 26 in communication with the reservoir 32, and the outlet 28 in communication with the tank 34. Liquid is thus pumped from the reservoir 32 into the tank 34 causing an increase in the gas pressure in the tank 34. With the machine 24 pumping against the resistance of the gas pressure in the tank 34, a torque is generated in the shaft 22 which rises progressively together with the gas pressure in the tank 34. A corresponding torque is generated in the output shaft 18, causing the vehicle to accelerate.

The motor 12 may be selected so that, during operation, the relative speed of rotation between the rotor 16 and stator 14 remains substantially constant. Thus, when the shaft 18 is stationary, the rate of rotation of the shaft 22 is equal to the relative rotation rate between the stator 14 and rotor 16. However, as the shaft 18 accelerates, the rate of rotation of the shaft 22 decreases accordingly, so that the relative rate of rotation between said stator 14 and rotor 16 remains constant.

Acceleration of the shaft 18 and deceleration of the shaft 22 continue until the shaft 22 is stationary, its torque balancing the pressure in the tank 34, and the shaft 18 rotating at the design operating speed of the system. When this situation is reached, there is no pumping from the machine 24, and the system acts as a direct drive, with the electric motor stator 14 stationary, and the shaft 18 rotating at the full design operating speed of the motor 12. At this design operating speed the torque in the shaft 22 and 18 balances the wind resistance, friction and any gravitational resistance or the like which exists to resist movement of the vehicle.

If for any reason the rotational speed of shaft 18 exceeds the design operating speed, the shaft 22 will turn in the opposite direction to its direction during vehicle acceleration, thereby causing flow of liquid from the tank 34 into the reservoir 32. This will continue until the pressure in the tank 34 is slightly too low to cause a torque in the shafts 18 and 22 which balances the resistance of the vehicle system to movement, so that the speed of shaft 18 will decrease towards the design operating speed. Should the speed of shaft 18 fall below design operating speed, the shaft 22 will possibly reverse again, to operate the machine 24 as a pump, and the torque will increase to cause the shaft 18 to increase its speed towards the design operating speed. Thus the pressure of the tank 34 will initially cycle slightly above and below the design operating pressure, with the shaft 22 rotating by a small amount slowly in opposite directions, until it becomes substantially stationary. The design operating speed of the system is thus automatically stabilized. This will be at the design operating speed of the motor 12, where the transmission is at its most efficient and is a direct drive.

To stop the vehicle, the valve 30 is operated to place it in the short-circuit position and the motor 12 is switched off. The clutch 20 is then operated to lock the rotor portion 16 and the stator portion 14 together, and the valve 30 is operated so that the drive wheels of the vehicle via the shaft 18 and shaft 22, as their forward movement is slowed, operate the machine 24 as a pump to pump further liquid into the accumulator 34 against the gas pressure therein. Braking of the vehicle thus takes place with an increase of pressure in the accumulator 34. After the vehicle becomes stationary, the pressure in the tank 34 would tend to drive the machine as a motor to reverse the direction of movement of the vehicle, and it is contemplated in this regard that the valve 30 can be placed in the short-circuit position or the vehicle will have a separate brake, e.g. a mechanical brake, to hold it stationary in this condition.

For start-up after braking, i.e. with the tank 34 at its increased pressure after braking as described above, any separate mechanical vehicle brake which has been applied, is released, and the valve 30 is operated so that pressure in the tank 34 operates the machine 24 as a motor, to drive the shaft 18 in the forward direction. As the vehicle moves forward, torque in the shafts 22, 18 decreases together with pressure in the tank 34.

At a desired predetermined pressure level in the tank 34, the electric motor is then started. Starting the electric motor 12 can be at zero torque, effected by moving the valve 30 to its short circuit position, then starting the motor 12, and then by returning the valve 30 to its position shown in FIG. 1 until the electric motor reaches its operating speed. Naturally, the clutch 20 will be disengaged simultaneously with, or slightly before, energising of the motor 12.

It is contemplated that when the motor 12 is switched on and reaches its operating speed, with the valve 30 in the position shown in FIG. 1 with the inlet 26 communicating with the reservoir 32 and the outlet 38 with the tank 34, the tank 34 will be at a pressure somewhat below the design operating pressure. The shafts 18 and 22 will thus rotate in opposite directions, with the machine 24 acting as a pump until the design operating speed of the shaft 18 and the design operating pressure of the tank 34 are again reached.

If desired, the direction of movement of the vehicle can be reversed by reversing the electrical connections to the stator 14, or by suitable operation of the valve 30, as the machine 24 is in principle fully reversible as a pump or motor. Some control of the rate of acceleration can be obtained, during start up after braking, by selecting the appropriate stage to start the motor 12, and/or by providing for throttling between the accumulator 34 and the machine 24.

Figure 2:
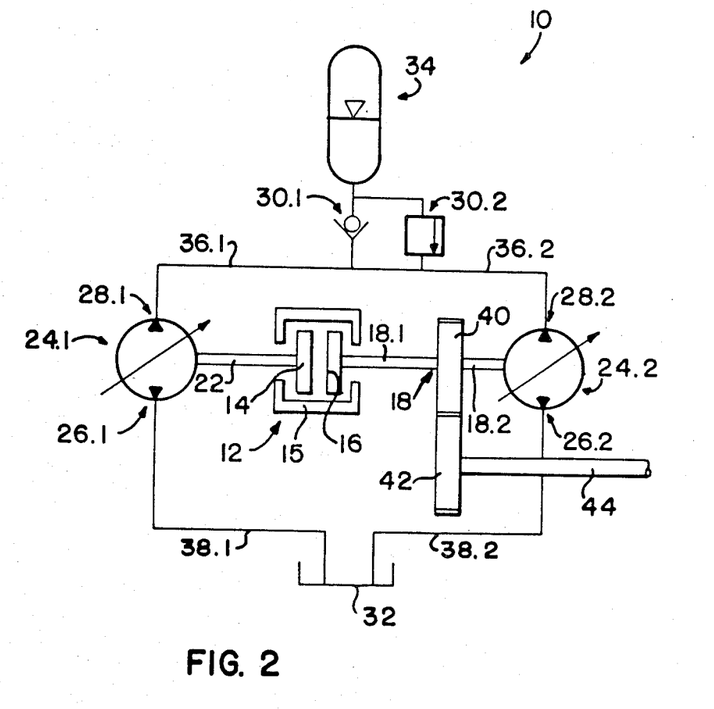
FIG. 2 shows a schematic diagram of another power transmission system in accordance with the invention.

With reference now to FIG. 2, the same reference numerals are used for the same parts as in FIG. 1, unless otherwise specified.

With reference to FIGS. 1 and 2, it will be noted that the fixed stroke hydrostatic machine 24 of FIG. 1 is replaced by a variable stroke hydrostatic machine, designated 24.1 in FIG. 2. In addition, the shaft 18, connected to the rotor 16 of the motor 12, is connected to a fully reversible variable stroke hydrostatic machine designated 24.2. The machines 24.1 and 24.2 of FIG. 2 are respectively connected to the reservoir 32 by flow lines 38.1 and 38.2, and to the accumulator 34 by flow lines 36.1 and 36.2. They thus operate in parallel between the reservoir 32 and tank 34. Between the flow lines 36.1 and 36.2 on the one hand and the tank 34 on the other hand, there are provided a non-return valve 30.1 for supplying liquid to the tank 34, and a shut-off valve 30.2 in parallel with the valve 30.1. The machine 24.1 is arranged to cause (as a pump) or permit (as a motor) liquid flow from flow line 38.1 to flow line 36.1.

The shaft 18 is provided with a gear wheel 40 which meshes with a further gear wheel 42 provided with a power output shaft 44. The gear wheel 40 divides the shaft 18 into portions 18.1 and 18.2.

As an alternative to the arrangement described with reference to FIG. 1, the motor 12 has a fixed portion 15 connected to a battery and two relatively rotatable portions 14, 16 in the fixed portion 15, the portions 14 and 16 being rotatable relative to each other and to the portion 15 about a common axis. The portion 14 is the electromechanical equivalent to the stator of FIG. 1, and the portion 16 is the electromechanical equivalent to the rotor 16 of FIG. 1. The shaft 44 is connected to the drive wheels of the vehicle.

To start the system 10 of FIG. 2 initially from rest, with the accumulator 34 empty of liquid, the shut-off valve 30.2 is closed, the machine 24.1 is set on zero stroke, and the machine 24.2 is set on maximum forward stroke, i.e. so that when shafts 18 and 44 rotate in a direction corresponding to the forward direction of the vehicle, liquid will flow through the machine 24.2 from the flow line 36.2 to the flow line 38.2.

Starting the motor 12 causes the machine 24.1 to rotate rapidly with negligible torque in the shafts 22, 18 and 44, as the machine 24.1 is set on zero stroke. As there is no liquid feed to the connection at 28.2 between the machine 24.2 and the flow line 36.2, the machine 24.2 remains stationary.

Increasing the stroke of the machine 24.1 causes liquid to be delivered from the flow line 38.1 to the flow line 36.1. This permits liquid to be delivered to what is at this stage the inlet 28.2 to the machine 24.2 and to pass from the flow line 38.2 to the reservoir 32. This permits a build-up of torque in the shafts 22, 18 and 44, and hence acceleration of the vehicle.

Advancing the stroke of machine 24.1 to full stroke, slows the machine 24.1 and speeds up the machine 24.2 and accelerates the vehicle until the machines 24.1 and 24.2 are running at the same speed, i.e. half the speed of the motor 12, in opposite directions.

The stroke of the machine 24.2 is then progressively reduced, thereby increasing the speed of the rotation of the machine 24.2, while correspondingly reducing the speed of rotation of the machine 24.1.

When the stroke of the machine 24.2 has been reduced to zero, no liquid can flow from the machine 24.1 to the machine 24.2 along the flow lines 36.1, 36.2, and machine 24.1 is brought to rest. At this stage, the rate of rotation of the machine 24.2 is the same as the rate of rotation between the portions 14 and 16 of the motor 12, and as the portion 14 is stationary, the design operating speed of the system has been reached, with the vehicle wheels being driven at the design operating speed. At this stage, machine 24.2 at zero stroke will consume little power, arising only from frictional losses and such leakage as may occur. Similarly, machine 24.1 will be stationary, and power losses will also be small, being confined to leakage, so a direct mechanical drive from the motor 12 is closely approximated.

It should be noted that, if at any stage the machine 24.1 pumps an excess of liquid into the flow lines 36.1, 36.2, for example during reduction of the forward stroke of the machine 24.2 as the system approaches the design operating speed, it will flow via the non-return valve 30.1 into the accumulator 34, to increase the gas pressure there, which can be released later as described hereunder.

Braking of the vehicle from the design operating speed takes place by setting the stroke of the machine 24.1 to zero, to prevent any flow of liquid through the machine 24.1, while reversing the stroke of the machine 24.2. The momentum of the vehicle causes the machine 24.2 to act as a pump, to pump liquid from the reservoir 22 via the flow line 36.2 and valve 30.1 into the accumulator 34. Increase of gas pressure in the accumulator 34 causes a torque to be generated in the shaft 44 which brakes the vehicle. During this braking, if the electric motor 12 is left on, a negligible amount of electric power will be absorbed by it, as the machine 24.1 is being driven on zero stroke. Instead, if desired, the motor 12 may be switched off during such braking. The rate of braking is controlled by the degree of reverse stroke applied to the machine 24.2.

To accelerate the vehicle forward after it has been braked to rest, the shut-off valve 30.2 is opened, and the machine 24.2 is set to forward stroke, while the machine 24.1 is maintained on zero stroke to prevent liquid flow therethrough. Flow of liquid from the accumulator 34 to the reservoir 32 via the machine 24.2 acting as a motor thus accelerates the vehicle in the forward direction, the degree of torque and acceleration depending on the gas pressure in the accumulator and on the degree of forward stroke in the machine 24.2.

As mentioned above, the electric motor 12 can be kept on during braking and subsequent acceleration or, if it has been switched off as described above, it can be switched on at any convenient time during the subsequent acceleration, as it will be under negligible load with the machine 24.1 on zero stroke.

Thus, the electric motor can be kept on at all times or it can be switched off during braking, and switched on during subsequent acceleration when the liquid is substantially exhausted from the accumulator 34, or at an intermediate stage. When the liquid becomes exhausted from the accumulator, the stroke of the machine 24.1 is increased from zero to a setting corresponding to the setting of the machine 24.2 at the speed which the vehicle has reached. Further acceleration of the vehicle then takes place by means of the motor 12, and by suitably altering the stroke settings of the machines 24.1 and 24.2, e.g. by setting the stroke of the machine 24.2 to its maximum forward stroke, increasing the stroke of the machine 24.1 until the machines 24.1 and 24.2 are running at the same speed in opposite directions at half the speed of the motor 12, and then, as described above, by progressively decreasing the stroke of the machine 24.2 to zero until the design operating speed of the vehicle is reached.

Instead, when the vehicle comes to rest after braking with the accumulator 34 pressurized, the valve 30.2 can be closed, and the vehicle can be set in motion in the same way as for the initial start-up described above, when the accumulator is empty. Then, when the vehicle has reached a suitable speed, the valve 30.2 can be opened, so that liquid escaping under pressure from the accumulator 34 (via the machine 24.2 acting as a motor) and flowing to the reservoir 32, acts to reinforce the torque provided by the motor 12.

It should be noted that the accumulator 34 contains its gas under pressure in a bag. There is thus always gas under pressure in the accumulator.

The two modes of start-up after braking result in different control characteristics, but both use the energy stored in the accumulator for the acceleration after braking.

It should be noted that the speed of the electric motor 12 will remain constant when it is switched on, and that the speeds of the machines 24.1 and 24.2, in opposite directions, will be such that their relative rates of rotation in total equal the rate of rotation of the motor portions 14 and 16 relative to each other. It should also be noted that the torque in the shaft 44 will be the sum of the torques in the portions 18.1 and 18.2 of the shaft 18, the torque in the shaft 22 being the same as the torque in the portion 18.1 of the shaft 18.

This means that when the vehicle reaches half its design operating speed and both the machines 24.1 and 24.2 are on full forward stroke, the output torque in the shaft is double the maximum torque available from either of the machines 24.1 or 24.2. On the other hand, when the vehicle is stationary the machine 24.1 will be at zero stroke with the machine 24.2 at some forward stroke, so that there will be zero torque in the shaft 22 and the torque in the shaft 44 will thus be equal to the torque in the portion 18.2 of the shaft 18, e.g. the maximum torque of the machine 24.2 when it is at full forward stroke. Likewise, at design operating speed, the stroke of the machine 24.1 will be at its maximum, and the stroke of the machine 24.2 will be zero, with zero torque in the portion 18.2 of the shaft 18, and maximum torque from the machine 24.1 in the shaft 22, so that the torque in the shaft 44 equals the maximum torque of the machine 24.1 in the shaft 22 and shaft 18.1.

Figure 4A:
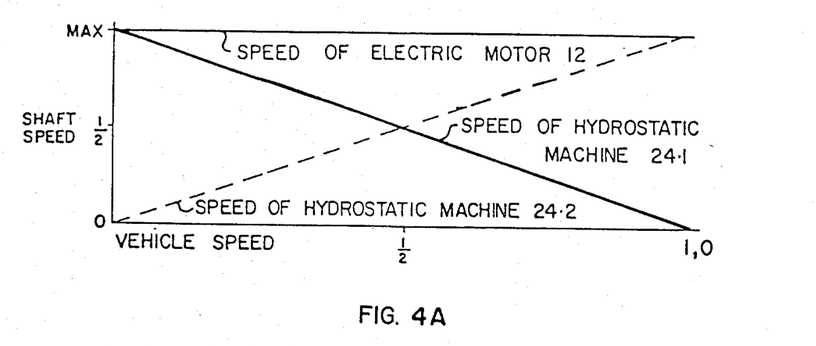
FIG. 4 shows graphically the speed, torque and power curves of the system of FIG. 2.
Figure 4B:
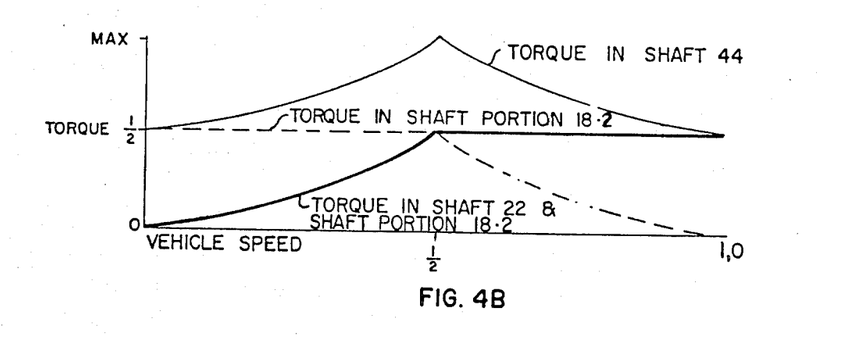
Figure 4C:
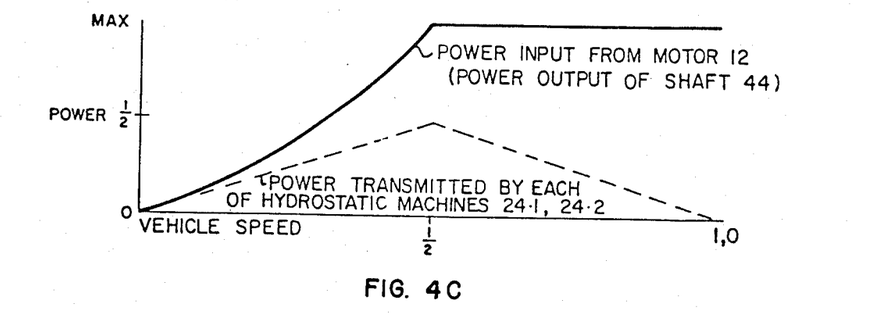

If leakage, frictional losses, and flow to or from the accumulator 34 are ignored, and if the machines 24.1 and 24.2 are regarded as being of the same size, power and capacity, with the gear wheels 40 and 42 of the same diameter and number of teeth, the speed, torque and power curves of the system are shown in FIG. 4. In FIG. 4A the shaft speeds of the various parts of the system are plotted against vehicle speed; in FIG. 4B the torques in the various shafts are plotted against vehicle speed; and in FIG. 4C the power output of the hydrostatic machines and electric motor are plotted against vehicle speed. Vehicle speed is plotted against the horizontal axes as a proportion of design operating (maximum) speed, and the other values are plotted against the vertical axes as proportions of their maxima.

FIG. 4C shows that the power flow through the hydrostatic circuit is always less than the actual power transmitted from the electric motor to the output shaft 44, and that the power flow through the hydrostatic circuit reduces to zero as the vehicle attains its design operating speed. If the power curves are integrated with respect to time, it is found that the amount of energy transmitted hydrostatically in accelerating from rest to maximum speed is about one-third of the total energy transmitted. In this regard it is assumed that the electric motor is selected to be capable of delivering a torque equal to the maximum torque of either of the machines 24.1 or 24.2. If this is not the case, the output torque and power curves will be modified.

The system of FIG. 2 retains a variable speed control capability, but has a higher overall efficiency than other similar systems known to the applicant, by virtue of the reduction of the amount of power transmitted hydrostatically, in particular at design operating speed when there is no hydrostatic power transmission. Furthermore, the system of FIG. 2 has a substantially enhanced output torque capability at part speeds, when compared with other systems known to the applicant.

An important feature of the system of FIG. 2 is its capacity for battery current levelling. At any stage during the drive cycle, it is possible to store energy in the accumulator 34, or to remove stored energy from it. For example, when the vehicle is under maximum cruising speed (design operating speed) conditions, and the machine 24.1 is on maximum forward stroke with the machine 24.2 on zero stroke, application of forward stroke on machine 24.2 will increase the available output torque by the amount contributed by machine 24.2 via shaft portion 18.2, provided that the shut-off valve 30.2 is opened and liquid under pressure is available from the accumulator. If the full output torque of the machine 24.2 is added to that of the motor 12, the output power is doubled at the shaft 44, but this naturally depends on the accumulator pressure. Conversely, setting the stroke of the machine 24.2 to a reverse value, will decrease the output torque at the shaft 44, and cause liquid to be pumped from the reservoir 32 into the accumulator 34. This means that the load on the electric motor 12 can be decreased or increased at will for periods which depend on the size of the accumulator fitted.

By measuring the current supplied to the motor 12, it is possible to draw on a supply of power from the accumulator when the battery current reaches a certain predetermined level. Alternatively, when the current drops to a certain level, power from the electric motor 12 may be used to recharge the accumulator 34. In this way, the battery current can be maintained between two predetermined desired levels, with resulting benefits to battery life and performance.

It is contemplated that the control of the transmission of FIG. 2 will require the use of a microprocessor to control the strokes of the machines 24.1 and 24.2, as well as to control the operation of the shut-off valve 30.2 in accordance with input from, for example, accelerator pedal deflection; brake pedal deflection; vehicle speed; battery current; accumulator pressure; and hydraulic circuit pressure. In this regard, hydraulic circuit pressure can advantageously be taken into account by the microprocessor, as it is desirable to avoid opening the valve 30.2 when there is a large pressure difference across it. By controlling the strokes of the machines 24.1 and 24.2 it is possible to raise the circuit pressure in the lines 36.1, 36.2 to match that of the accumulator 34 before the valve 30.2 is opened.

Modifications contemplated for the system of FIG. 2 include the use of field weakening techniques to increase the speed of the motor 12 or, if desired, to provide for an auxiliary reduction gear change for the output shaft 44, for example where additional torque is needed for hill-climbing.

It is, however, believed that the primary advantage of the invention with reference to FIG. 2, is the capability for infinitely variable speed control, while hydrostatically transmitted power is reduced to a minimum, at initial start-up, and also as design operating speed is approached. The accumulator 34 provides for efficient regenerative braking in that power stored during braking can be used for subsequent acceleration from rest, and the accumulator 34 also provides the advantage of battery current levelling to increase the life and performance of the batteries.

Figure 3:
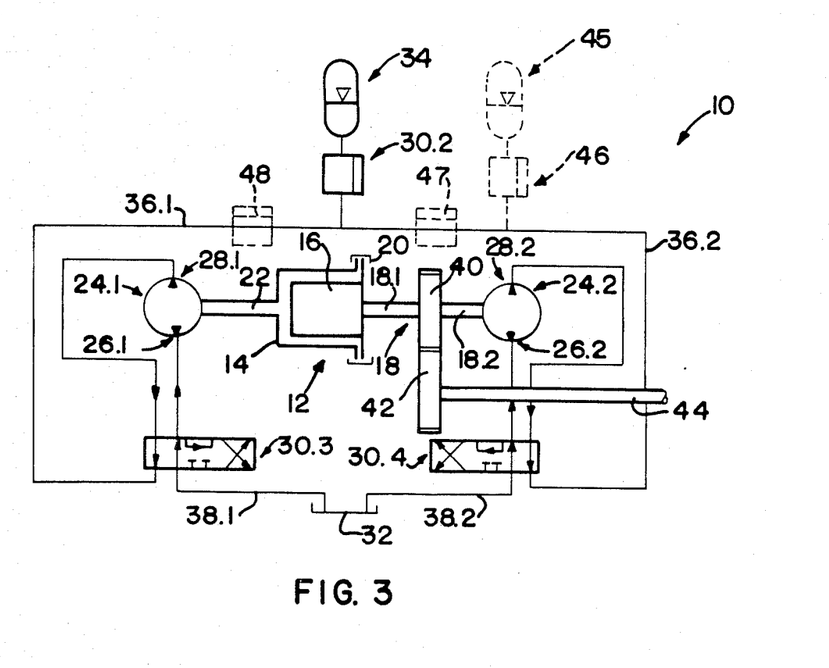
FIG. 3 shows a schematic diagram of a yet further power transmission system in accordance with the invention.

With reference first to FIG. 3 of the drawings, the same reference numerals are used as in FIGS. 1 and 2 for the same parts, unless otherwise specified. Reference numeral 10 generally designates a further power transmission system in accordance with the invention. The power transmission system comprises an electric motor 12 having a stator portion 14 rotatably mounted on a mounting or anchorage (not shown) on a battery-driven wheeled vehicle (also not shown). The stator portion 14 is provided with a slip ring arrangement for feeding electric power thereto from a power supply in the form of an electrochemical battery. For ease of illustration the slip ring arrangement and battery are omitted from FIG. 3.

The motor 12 has a rotor portion 16 rotatable relative to the stator portion, co-axial with the rotation of the stator portion 14 on its anchorage or mounting. The rotor portion 16 has a power output shaft 18 for connection to the vehicle wheels (not shown) as described hereunder, and the stator portion 14 and rotor portion 16 are lockable together by means of an electric clutch 20 to prevent relative rotation therebetween.

The stator portion 14 is in turn provided with a shaft 22 rotatable about the axis of the motor 12, and drivingly connected to a fixed stroke hydrostatic machine 24.1, the shaft 18 being connected to a fixed stroke hydrostatic machine 24.2. The machines 24.1 and 24.2 are not necessarily identical but each is capable of acting as a pump or motor and in practice they may often be identical. The said machines 24.1, 24.2 have liquid inlets at 26.1 and 26.2, and liquid outlets at 28.1 and 28.2, the inlets 26.1, 26.2 and outlets 28.1, 28.2 being in communication respectively via three-way valves 30.3 and 30.4 with a liquid reservoir 32 and a hydrostatic accumulator 34 in the form of a tank filled with gas under pressure. In FIG. 3, the outlets 28.1, 28.2 are shown connected to the accumulator 34 by flow lines 36.1 and 36.2 passing through valves 30.3, 30.4. The inlets 26.1, 26.2 in turn are shown connected to the reservoir 32 by flow lines 38.1 and 38.2 passing through the valves 30.3, 30.4.

Between the flow lines 36.1 and 36.2 on the one hand and the accumulator 34 on the other hand, there is provided a shut-off valve 30.2.

The valves 30.3, 30.4 are capable of placing the outlets 28.1, 28.2 in communication with either the reservoir 32 or the accumulator 34, and are capable of placing the respective inlets 26.1, 26.2 in communication with either the accumulator 34 or the reservoir 32 (as the case may be) to permit flow from the reservoir to the accumulator via the machines 24.1, 24.2 or vice versa. Each of the valves 30.3, 30.4 is also capable of short-circuiting the machines 24.1 and 24.2 respectively, so that the outlets 28.1, 28.2 are placed directly in communication with their inlets 26.1, 26.2, while the flow lines 36.1, 38.1 or 36.2, 38.2, as the case may be, are shut off.

The shaft 18 is provided with a gear wheel 40 which meshes with a further gear wheel 42 provided with a power output shaft 44 which is connected to the drive wheels of the vehicle.

To start the system 10 of FIG. 3 initially from rest, with the accumulator 34 empty of oil but under a relatively low level of gas pressure, the valve 30.2 is opened, the clutch 20 is disengaged so that the rotor 16 can rotate freely relative to the stator 14, and the valve 30.3 is arranged so that the outlet 28.1 feeds directly to the inlet 26.1 with the flow lines 36.1, 38.1 shut off, in which case rotation of the motor 12 causes the machine 24.1 to rotate freely under no load. The valve 30.4 is in turn arranged so that flow through the machine 24.2 acting as a motor from the line 36.2 to the line 38.2 will cause a torque in the machine 24.2 and the portion 18.1 of the shaft 18 tending to drive the shaft 18 in the forward direction to accelerate the vehicle.

Starting the motor 12 causes electric power from the battery to be supplied via the slip rings to the stator 14, and the rotor 16 and stator 14 start to rotate relative to each other. The machine 24.1 rotates freely under very little torque and the machine 24.2 remains stationary due to the inertia of the vehicle. The valve 30.3 is then arranged so that rotation of the stator 14 by the motor 12 causes the machine 24.1 to act as a pump, receiving liquid at inlet 26.1 from the reservoir 32 and discharging it at outlet 28.1 to the flow line 36.1 as shown in FIG. 3.

Liquid is then pumped by the machine 24.1 from the reservoir 32 into the accumulator 34, causing an increase in the gas pressure in the accumulator 34. When the machine 24.1 is pumping against the resistance of the gas pressure in the accumulator 34, a torque is generated in the shaft 22 which rises progressively together with the gas pressure in the accumulator 34. A corresponding torque is generated in the portion 18.1 of the shaft 18 and via gear wheels 40, 42 in shaft 44, causing acceleration of the vehicle. The valve 30.4 is in the mode described above i.e. with flow line 36.2 in communication with the reservoir 32 via machine 24.2 arranged to act as a motor and via flow line 38.2. Flow of liquid in the circuit from flow line 36.2 through machine 24.2 from its inlet 26.2 to its outlet 28.2 and thence to flow line 38.2, thus causes machine 24.2 to act as a motor tending to drive the vehicle forward. The torque from machine 24.2 in portion 18.2 of shaft 18 is additive to the torque of the motor 12 in portion 18.1 of shaft 18, so that the starting torque for the vehicle is substantially double that of the motor 12. As long as the machine 24.1 rotates and pumps more rapidly than the machine 24.2 runs as a motor, pressure will increase in the circuit constituted by the accumulator 34 and lines 36.1 and 36.2, the machine 24.1 progressively slowing down while the machine 24.2 correspondingly accelerates to maintain a constant speed of motor 12.

In other words under the influence of the starting torque, the vehicle accelerates and as the shaft 18 accelerates the machine 24.1 directs a progressively lesser proportion of its output into the accumulator 34, and a progressively higher proportion of its output via flow line 36.2 through the machine 24.2 to the reservoir 32. When machine 24.2 reaches the same speed as machine 24.1, the flow of liquid in flow line 36.1 will equal the flow in 36.2, and no further liquid will be pumped into the accumulator 34.

The sum of the speeds of machines 24.1 and 24.2 will remain substantially constant throughout i.e. equal to the speed of the motor 12. Thus, when the flow of liquid in flow lines 36.1 and 36.2 is equal, machines 24.1 and 24.2, if they are identical, will be running at the same speed of rotation in opposite directions, this speed being equal to half the speed of the motor 12. If machines 24.1 and 24.2 are not identical, their speeds of rotation will differ.

As the output torque thereafter, for identical machines 24.1 and 24.2, continues to accelerate the vehicle, there will be a progressive decrease in the rotational speed of machine 24.1 and a progressive increase in rotational speed of machine 24.2. The flow of liquid in flow line 36.1 becomes progressively less, and when the flow is less than that in flow line 36.2, the difference is supplemented by progressive removal of liquid at an increasing rate from the accumulator 34. As the speed of the vehicle increases, the rotational speed of machine 24.1 and the flow of liquid in flow line 36.1 decrease until the machine 24.1 is stationary when the vehicle reaches its cruising speed. At this stage, machine 24.2 receives all its liquid from the accumulator 34. To avoid excessive removal of liquid from the accumulator 34, the valve 30.4 may be operated at any time to short-circuit machine 24.2 and shut off the flow lines 36.2, 38.2 so that machine 24.2 circulates liquid from its inlet to its outlet and operates under a negligible load.

In this configuration, no power is transmitted hydrostatically through machines 24.1 and 24.2, and the vehicle is driven directly from the electric motor 12. With gear wheels 40 and 42 having the same number of teeth, the torque in shaft 44 is now equal to the torque of motor 12 in shaft 18.1, with machine 24.2 contributing no torque via shaft 18.2. With gear wheels 40 and 42 having the same number of teeth, the torque in shaft 44 is now equal to the torque of motor 12 in shaft 18.1, with machine 24.2 contributing no torque via shaft 18.2.

Throughout acceleration as described above, while machines 24.1 and 24.2 are both operational, output torque in shaft 44 is the sum of the torques in shafts 18.1 and 18.2, and if the machines 24.1 and 24.2 are identical, torque in shaft 44 will be substantially double that of motor 12, at half cruising speed when pressure in the accumulator 34 is a maximum. Thereafter, as cruising speed is approached, power stored in the accumulator 34 is fed back into the system and torque reduces.

At any stage during the acceleration of the vehicle, the valve 30.4 may be moved to short-circuit the machine 24.2, thereby effectively eliminating the additional torque from the machine 24.2. With the system 10 in this configuration, the machine 24.1 will continue to act as a pump and to transfer liquid from the reservoir 32 to the accumulator 34. The system 10 will then have an output torque equal to that of the motor 12 which will rise to a maximum at cruising speed when oil flow into the accumulator ceases. However, if machine 24.2 is not short-circuited, the accumulator at cruising speed will have a pressure below the maximum reached at half cruising speed. Whatever the starting mode the accumulator pressure at cruising speed with machine 24.2 short-circuited will tend to become equal to that necessary to maintain the torque in the motor 12 to drive the vehicle at its cruising speed.

Braking of the vehicle may take place in either of two ways, depending on whether only machine 24.2 or both machines 24.1 and 24.2 are used. When the braking of the vehicle is done by machine 24.2 only, the rotor portion 16 and the stator portion 14 of the motor 12 remain freely rotatable with respect to each other, and the valve 30.4 is operated so that the drive wheels of the vehicle via the shaft 44, the gear wheels 42, 40, and the shaft 18.2, operate the machine 24.2 as a pump to pump liquid from the reservoir 32 into the accumulator 34 against the gas pressure therein, with the line 38.2 connected to the inlet 26.2, and the outlet 28.2 to the line 36.2. At the same time, the valve 30.3 is operated so that the machine 24.1 is short-circuited and the lines 36.1, 38.1 are shut off. Increase of gas pressure in the accumulator 34 causes a torque to be generated in the shaft portion 18.2 and shaft 44 which brakes the vehicle. During this braking, if the electric motor 12 is left on, a negligible amount of electric current will be drawn by it, as the machine 24.1 is operating at zero torque. Instead, if desired, the motor 12 may be switched off during such braking. Machine 24.1 can also be used for braking by itself, the clutch 20 being operated to lock the motor parts 14 and 16 together, the valve 30.4 being operated to short-circuit the machine 24.2, and the valve 30.3 being operated so that forward movement of the vehicle causes the machine 24.1 to act to pump liquid from the reservoir 32 to the accumulator 34, the motor 12 being switched off.

If a greater deceleration or braking is required, both machines 24.1 and 24.2 may be employed by operating the clutch 20 so that the rotor portion 16 and the stator 14 of the motor 12 are locked together. At the same time, the valve 30.3 is operated to place the reservoir 32 in communication with the accumulator 34 via flow lines 38.1 and 36.1 and the machine 24.1, and so that forward motion of the vehicle causes machine 24.1 to pump liquid from the reservoir 32 into the accumulator 34. The inlets 26.1, 26.2 will be connected to flow lines 38.1, 38.2, and the outlets 28.1, 28.2 to the flow lines 36.1, 36.2. The machines 24.1 and 24.2 will now simultaneously pump liquid from the reservoir 32 into the accumulator 34, against the pressure in the accumulator 34, thereby effectively doubling the braking torque, the torque in shafts 22 and 18.1 also contributing to the torque in shaft 44.

During regenerative braking, the valve 30.2 will naturally be open, and when the vehicle comes to rest this valve will be closed to store the energy which has accumulated in the accumulator.

The vehicle may be accelerated forward after it has been braked to rest or after the accumulator has been charged to a high pressure by means of the electric motor driving machine 24.1 as a pump from the batteries, or from an external source of electricity while the vehicle is stationary. To accelerate the vehicle the shut-off valve 30.2 is opened, and the valves 30.3 and 30.4 are operated to cause the machines 24.1, 24.2 to run as motors to drive the vehicle forward while liquid flows from the accumulator 34 to the reservoir 32 via the machines 24.1, 24.2. This is done by connecting inlets 26.1, 26.2 to the flow lines 36.1, 36.2, and the outlets 28.1, 28.2 to the flow lines 38.1, 38.2. The flow of liquid from the accumulator 34 to the reservoir 32 via the machines now accelerates the vehicle in the forward direction, the degree of torque and acceleration depending on the gas pressure in the accumulator.

The clutch 20 will lock the motor parts 16, 18 together during this acceleration. A reduced acceleration can also be obtained if, through operating valves 30.3, 30.4, only the machine 24.2 is driven, and the machine 24.1 is short-circuited. The machine 24.1 can run under no load with the clutch 20 operative to lock the motor parts 14, 16 together, or, with the machine 24.1 short-circuited and stationary, the clutch 20 can be disengaged. Instead, with the clutch 20 operative, the machine 24.2 can be short-circuited, while the machine 24.1 is driven as a motor.

As mentioned above, the electric motor 12 can in certain modes be left on during braking and it can also be left on during subsequent acceleration, or, if it has been switched off as described above, it can be switched on at any convenient time during the subsequent acceleration. Thus, depending on the braking or acceleration mode, the electric motor can be kept on at all times or it can be switched off during braking, and switched on during subsequent acceleration, e.g. when the liquid is substantially exhausted from the accumulator 34, or at an intermediate stage. Naturally, the motor 12 will be off whenever its parts 14, 16 are locked by the clutch 20.

When both machines are used to accelerate, the clutch 20 is engaged, and it must be disengaged when the electric motor is started. Whether one machine is used or whether both machines are used, the electric motor should be started with no load, i.e. with machine 24.1 short-circuited. When the electric motor reaches its operating speed, the appropriate valve 30.3, 30.4 is set so that the machine 24.1 pumps liquid from the line 38.1 to the line 36.1, and so that the machine 24.2 acts as a motor driven by liquid passing from line 36.2 to line 38.2. The torque of the electric motor then reinforces the accelerative torque provided by the machine 24.2 acting as a motor. When the vehicle reaches its operating speed, as at initial start-up, the machine 24.2 is short-circuited, and the wheels of the vehicle are then driven directly from the electric motor 12.

It should be noted that the speed of the electric motor 12 will remain substantially constant when it is switched on, and that the speeds of the machines 24.1 and 24.2, in opposite directions, will be such that their relative rates of rotation in total equal the rate of rotation of the stator 14 of the motor 12 relative to its rotor 16. It should also be noted that if the gear wheels 40 and 42 are of the same diameter and number of teeth, the torque in the shaft 44 will be the sum of the torques in the portions 18.1 and 18.2 of the shaft 18, the torque in the shaft 22 being the same as the torque in the portion 18.1 of the shaft 18. This means that throughout the period of acceleration of the vehicle when the electric motor operates together with the machine 24.1 acting as a pump and the machine 24.2 acting as a motor, as described, the output torque in the shaft 44 is the sum of the torque in the shaft 22 and the torque in the shaft 18.2, the output torque reaching a maximum when the vehicle reaches half its design operating speed (at which stage the pressure in the accumulator 34 will be at a maximum).

Figure 5A:
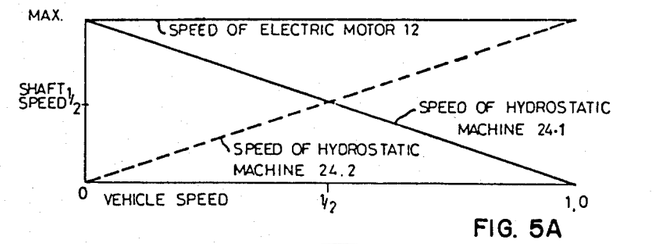
FIG. 5 shows graphically the speed, the torque, and the power curves of the system of FIG. 3.
Figure 5B:
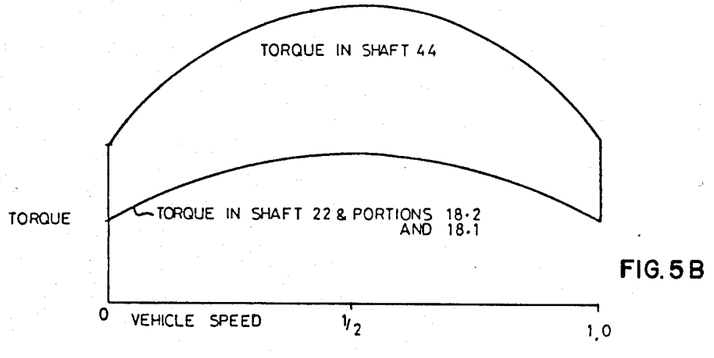
Figure 5C:
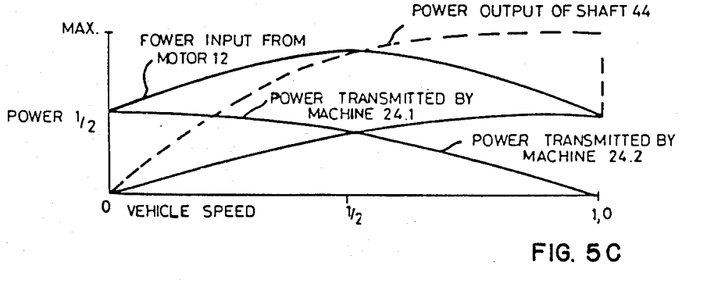

If leakage, frictional losses, and flow to or from the accumulator 34 are ignored, and if the machines 24.1 and 24.2 are regarded as being of the same size, power and capacity, with the gear wheels 40 and 42 of the same diameter and the same number of teeth, the speed, torque and power curves of the system are shown in FIG. 5. In FIG. 5A, the shaft speeds of the various parts of the system are plotted against vehicle speed in the mode with machine 24.1 acting as a pump and machine 24.2 acting as a motor; in FIG. 5B for the same mode the torques in the various shafts are plotted against vehicle speed; and in FIG. 5C for the same mode the power output of the hydrostatic machines and electric motor are plotted against vehicle speed. Vehicle speed is plotted against the horizontal axes as a proportion of design operating (maximum) speed, and the other values are plotted against the vertical axes as proportions of their maxima.

There are two different ways of operating the power transmission system 10 to give a levelling effect to the battery current flow at its design operating speed. In the first method, the valve 30.3 controlling the machine 24.1, is set to place the flow line 38.1 in communication with the flow line 36.1 via the machine 24.1, and the switch 30.4 is set to short-circuit the machine 24.2. This corresponds to the valve positions at the end of initial or regenerative acceleration as described above. If the road resistance to the vehicle increases, the output torque in shaft 44 is insufficient to maintain the vehicle speed and, as the vehicle slows down, the machine 24.1 starts pumping liquid from the reservoir 32 into the accumulator 34, causing the pressure therein to rise. This in turn creates a forward torque in the shaft 18.1, thus combatting the slowing down of the vehicle.

If, on the other hand, the road resistance decreases, the vehicle tends to accelerate above the design operating speed, the pressure drop across the machine 24.1 will drive it in reverse as a motor so that the reservoir 32 receives liquid via the machine 24.1 from the accumulator 34, thus lowering the pressure in the accumulator. This causes a decrease in forward torque in the shaft 18.1 and a tendency of the vehicle to slow down. The vehicle is therefore kept near or at its design operating speed, i.e. the speed at which the machine 24.1 remains stationary. During this time, the battery current will vary smoothly in proportion to the pressure in the accumulator 34 rather than being subjected directly to any drastic changes in the load, e.g. an increase in pressure in the accumulator will cause an increase in torque on the electric motor which in turn will draw more current, and vice versa for a decrease in pressure in the accumulator.

In a second mode of operation, the tendency for the vehicle to vary its speed, may be opposed by operating the valve 30.4 to control the flow of liquid through the machine 24.2, either to the accumulator 34 from the reservoir 32 or vice versa, as required to assist or oppose the torque from the electric motor 12. Both machines are thus used simultaneously for this purpose, the step function changes in torque caused by the machine 24.2 being superimposed on the smooth slight changes in torque caused by the machine 24.1.

With only one high pressure accumulator 34 in use, using machine 24.2 will cause the output torque in shaft 44 be increased or decreased in steps of 100% of its existing value, which could be excessive in a case where the road resistance varies by only small amounts. By fitting a second accumulator 45 (shown in broken lines), with a lower operating pressure and shut-off valves 46, 47 (broken lines), the variations in torque due to the machine 24.2 will be smaller. When the valve 47 is closed the machine 24.2 will be connected only to accumulator 45 and the machine 24.1 only to accumulator 34. The variations in torque caused by the machine 24.2 in response to switching the valve 30.4 to assist or oppose the torque of the motor 12 will then be smaller than the variations caused when the machine 24.2 is connected to accumulator 34 but will likewise be superimposed on the changes in torque caused by the machine 24.1. For braking and accelerating the accumulator 45 can be isolated with valve 46 closed and valve 47 open, and it can be kept at its design pressure by being charged e.g. via a suitable pressure reduction valve from the accumulator 34. Furthermore, by using a shut off valve at 48, the contribution of the machine 24.1 to current levelling can be cancelled entirely, and only the machine 24.2 can be used, in conjuncion with the accumulator 34, or with the accumulator 45 if provided.

The Applicant believes that the advantage of the battery levelling method using the machine 24.1 alone is that there are no sudden changes in driving torque on the vehicle and that the driving characteristics of a vehicle having such a system would resemble those of a conventional motor vehicle. The applicant further believes that the method using the machine 24.1 alone has the advantage that a more constant vehicle speed can be maintained in spite of substantially varying road resistance to the vehicle, providing the variations are not beyond the capacity of the accumulator or accumulators 34, 45. It is possible however that the combination of the two methods, i.e. superimposing the effect of the machines 24.1 and 24.2, will provide the most satisfactory solution.

It is contemplated that the control of the transmission will require the use of a microprocessor to control the position of the various valves as well as the switching of the power supply to the electric motor 12 and its clutch 20 in accordance with input from, for example, accelerator pedal deflection; brake pedal deflection; battery current; and accumulator pressure. In this regard, the microprocessor would be a relatively simple one since no proportional controls or analogue signals need be used.

Modifications contemplated for the system of FIG. 3 include the use of field weakening techniques to increase the speed of the motor 12.

It is believed that the primary advantage of the embodiment of FIG. 3 is that a constant speed electric motor may be used for accelerating a vehicle from rest to design operating speed at which point there is a direct mechanical drive between the electric motor 12 and the wheels of the vehicle. The use of one or more hydraulic accumulators 34, 45 provides for efficient regenerative braking and also provides the advantage of battery current levelling, to increase the life and performance of the battery.

It will be appreciated that, while three embodiments of the invention have been shown with reference to the drawings, numerous variations are possible while remaining within the scope of the present invention.

Thus, while FIGS. 1 and 3 show fixed stroke hydraulic machines (which are sometimes preferred because of their low cost), these can be replaced by variable stroke hydraulic machines which, although more expensive, can be desirable if reduced transmission shocks, e.g. at the start of acceleration or braking, are desired. In FIG. 3, either or both of the hydraulic machines can be variable stroke, and it will be possible to dispense with the associated three-way switch when this is done, although it is preferably retained for flexibility in operation.

Although the embodiment of FIG. 2 can be operated as described without a clutch, a clutch can naturally be provided to lock the electric motor parts together when the motor is not energized. This can permit both hydrostatic machines to be used in parallel for regenerative bracking and regenerative acceleration, in a fashion similar to that described for FIG. 3. Whenever a clutch is used in any of the embodiments, it will be apprecated that it should be arranged to uncouple the motor parts automatically, no later than the moment the electric motor is energized. In this regard it should also be noted that the motors 12 of FIGS. 1 to 3 are electromechanical equivalents of each other, that of FIG. 2 being less suitable for a clutch and hence illustrated in FIG. 2.

In FIGS. 2 and 3, the power output is shown taken in preferred fashion off the shaft 18 between the motor 12 and machine 24.2 for convenience. In principle, however, the power output could be taken off a similar position on shaft 22, or on outward extensions of said shafts 18 or 22, on the opposite sides of the associated hydrostatic machines from the motor 12. Furthermore, the shaft 18 may in fact, in FIGS. 2 and 3, be the power output shaft, the hydrostatic machine 24.2 instead being geared to the shaft 18 by gears such as 40 and 42 to provide the mechanical equivalent of FIGS. 2 and 3, and the same applies if the power output is to be from shaft 22.

Finally, it should be noted that, although in general with reference to FIG. 2 and particularly FIG. 3, the hydrostatic machines have been usually described as identical, they can be of different sizes without any change in principle of the invention. In FIG. 3 for example, this will allow three rates of regenerative braking or acceleration, the two different machines each providing a different rate when used separately, and the third rate being available when they are used together. Furthermore, each of the hydrostatic machines of FIGS. 2 or 3 may be substituted by two or more machines connected in parallel. These smaller machines connected in parallel will usually be smaller fixed-stroke machines and will provide enhanced flexibility of operation to vary regenerative braking and acceleration torques with smaller step formation changes. Indeed, one or more of the machines connected in parallel may be a variable stroke machine to provide even greater flexibility, and the same considerations apply in principle to the construction of FIG. 1. However, when variable stroke machines, as shown in FIG. 2, are used, or when the machines of FIGS. 1 and 3 are in fact variable and not fixed stroke machines, then there may be little advantage in having them substituted by several machines.

Furthermore, the shaft portion 18.2 of FIG. 2 can have a clutch to allow the machine 24.2, which normally idles at cruising speed, to be disconnected to reduce drag while cruising.

I claim:

1. A power transmission system comprising an electric motor for connection to an electric power supply, the motor comprising two relatively rotatable motor portions provided with a clutch whereby they are lockable relative to each other, each of which motor portions is rotatable relative to an anchorage or mounting for the motor, coaxially with the axis of rotation between the two motor portions, one of the motor portions being provided with a power output for the system, and the other being drivingly connected to at least one hydrostatic machine capable of acting as a pump or as a motor, and in liquid flow communication with at least one hydrostatic accumulator and a liquid source, the hydrostatic machine having a three-way valve in circuit therewith whereby the connections of the hydrostatic machine to the liquid source and accumulator can be reversed, and whereby it can be short-circuited and isolated simultaneously from said accumulator and source.

2. A system as claimed in claim 1, in which the hydrostatic accumulator is a tank for containing gas under pressure and liquid, the liquid source being a liquid reservoir arranged during operation of the system to supply liquid to the tank and to receive liquid from the tank.

3. A system as claimed in claim 1, in which the hydrostatic machine is a fixed stroke hydrostatic machine.

4. A system as claimed in claim 1, in which the hydrostatic machine is a variable stroke hydrostatic machine.

5. A system as claimed in claim 1, which includes two fixed stroke hydrostatic machines connected in parallel.

6. A system as claimed in claim 1, which includes one fixed stroke hydrostatic machine and one variable stroke hydrostatic machine.

7. A system as claimed in claim 1, which includes two variable stroke hydrostatic machines connected in parallel.

8. A system as claimed in claim 5, which includes two hydrostatic accumulators of different volumes, each adapted to hold liquid and gas under pressure, and each being in liquid flow communication with the hydrostatic machines.

9. A system as claimed in claim 5, in which each hydrostatic accumulator is provided with a shut-off valve for isolating it from the hydrostatic machines.

10. A system as claimed in claim 5, in which the power output is from a shaft between one of the motor portions and an associated hydrostatic machine.

* * * * *